(12) United States Patent
Meldal et al.

(10) Patent No.: US 6,828,392 B2
(45) Date of Patent: Dec. 7, 2004

(54) HYDROXY AND AMINE FUNCTIONALIZED RESINS

(75) Inventors: Morten Peter Meldal, Frederiksberg (DK); Thomas Groth, Copenhagen K (DK)

(73) Assignee: Carlsberg A/S, Copenhagen (DK)

( * ) Notice: Subject to any disclaimer, the term of this patent is extended or adjusted under 35 U.S.C. 154(b) by 338 days.

(21) Appl. No.: 09/942,079

(22) Filed: Aug. 28, 2001

(65) Prior Publication Data

US 2003/0096918 A1 May 22, 2003

(51) Int. Cl.$^7$ .............................. C08G 8/28; C08L 61/20

(52) U.S. Cl. ................. 525/509; 424/78.08; 424/78.17; 424/94.1

(58) Field of Search .......................... 525/509; 424/94.1, 424/78.17, 78.08

(56) References Cited

PUBLICATIONS

Arshady, R., "Beaded Polymer Supports and Gels", *J. Chromnatogr.*, vol. 586, pp. 181–197 (1991).
Atherton, E. et al., *Solid Phase Peptide Synthesis—A Practical Approach*, IRL Press, Oxford, pp. 1–85, 131–161 (1989).
Auzanneau, F.–I. et al., "Synthesis, Characterization and Biocompatibility of PEGA Resins", *J. Pept. Sci.*, vol. 1, pp. 31–44 (1995).
Blankemeyer–Menge, B. et al., "An Efficient Method for Anchoring FMOC—Amino Acids to Hydroxyl–Functionalised Solid Supports", *Tetrahedron Lett.*, vol. 31, No. 12, pp. 1701–1704 (1990).
Boccù, E. et al., "Coupling of Monomethoxypolyethyleneglycols to Proteins via Active Esters", *Z. Naturforsch.*, vol. 38c, pp. 94–99 (1983).
Buchardt, J. et al., "A Chemically Inert Hydrophilic Resin for Solid Phase Organic Synthesis", *Tethrahedron Lett.*, vol. 39, No. 47, pp. 8695–8698 (1998).
Corey, E.J. et al., "A New and Highly Effective Method for the Oxidation of Primary and Secondary Alcohols to Carbonyl Compounds", *J. Am. Chem. Soc.*, vol. 94, pp. 7586–7587 (1972).
Cotter, R.J. et al., *Ring–Forming Polymerizations. Part B, 1: Heterocyclic Rings in Orgainc Chemistry* ed. Blomquist, A.T. and Wasserman, H., Academic Press, New York, vol. 13b, pp. 1–89 (1972).
Czarnik, A.W., "Encoding Strategies in Combinatorial Chemistry", *Proc. Natl. Acad. Sci. USA*, vol. 94, pp. 12738–12739 (1997).
D'Alelio, D.F. et al., "The Synthesis of Thermally Stable Polymeric Azomethines by Polycondensation Reactions", *J. Macromol. Sci., Rev. Macromol. Chem.*, vol. C3, No. 1, pp. 105–234 (1969).

de Nooy, A.E.J. et al., "On the Use of Stable Organic Nitroxyl Radicals for the Oxidation of Primary and Secondary Alcohols", *Synthesis,* vol. 1996, No. 10, pp. 1153–1174 (1996).
Del Nery, E. et al., "Characterization of the Substrate Specificity of the Major Cysteine Protease (Cruzipain) from Trypanposoma Cruzi using a Portion–Mixing Combinatorial Library and Flurogenic Peptides" *Biochem. J.,* vol. 323, Part 2, pp. 427–433 (1997).
Fitch, W.L. et al., "High–Resolution $^1$H NMR in Solid–Phase Organic Synthesis", *J. Org. Chem.,* vol. 59, pp. 7955–7956 (1994).
Gotfredsen, C.H. et al., "Single–bead Structure Elucidation. Requirements for Analysis of Combinatorial Solid–Phase Libraries by Nanoprobe MAS–NMR Spectroscopy", *J. Chem. Soc., Perkin Trans I.,* pp. 1167–1171 (2000).
Grøtli, M. et al., "Physical Properties of Poly(ethylene Glycol)(PEG)–Based Resins for Combinatorial Solid Phase Organic Chemistry: A Comparison of PEG–Cross–Linked and PEG–Cross Linked and PEG–Grafted Resins",*J. Comb. Chem.,* vol. 2, No. 2, pp. 108–119 (2000).
Harris, J.M. et al., "Synthesis and Characterization of Poly- (ethylene Glycol) Derivatives",*J. Polym. Sci. Polym. Chem. Ed.,* vol. 22, pp. 341–352 (1984).
Holmes, C.P. et al., "Reagents for Combinatorial Organic Synthesis: Development of a New o–Nitrobenzyl Photo- labile Linker for Solid Phase Synthesis",*J. Org. Chem.* vol. 60, pp. 2318–2319 (1995).
Hudson, D., "Matrix Assisted Synthetic Transormations: A Mosaic of Diverse Contributions. I. The Pattern Emreges", *J. Comb. Chem.,* vol. 1, No. 5, pp. 333–360 (1999).
Hudson, D., "Matrix Assisted Synthetic Transformations: A Mosaic of Diverse Contributions. II. The Pattern is Completed",*J. Comb. Chem.,* vol. 1, No. 6, pp. 403–457 (1999).
Kisfaludy, L. et al., "Preparation and Applications of Pentafluorphenyl Esters of 9–Fluorenylmethyloxycarbonyl Amino Acids for Peptide Synthesis", *Synthesis,* vol. 1983, pp. 325–327 (1983).
Kita, Y. et al., "Facile and Efficient Syntheses of Carboxylic Anhydrides and Amides Using (Trimethylsilyl)ethoxyacetylene", *J. Org. Chem.,* vol. 51, pp. 4150–4159 (1986).

(List continued on next page.)

*Primary Examiner*—Ana Woodward
(74) *Attorney, Agent, or Firm*—Merchant & Gould P.C.

(57) ABSTRACT

A star-blocked polymeric material based on polyethylene glycol and having a uniform distribution of both hydroxy and amine functional groups throughout the polymeric material is described. The polymeric material, known as HYDRA (hydroxy and amine functionalized resin), is prepared by forming a polyimine compound by reacting an aldehyde and an amine. The polyimine is then reacted with a reducing agent to form a star-blocked polymeric material. HYDRA resins can be used, for example, as solid supports for organic synthesis, for enzymatic assays, for immobilization of biomolecules, for controlled release of drugs, and for chromatographic separations.

51 Claims, 3 Drawing Sheets

PUBLICATIONS

Knorr, R. et al., "New Coupling Reagents in Peptide Chemistry", *Tetrahedron Lett,* vol. 30, No. 15, pp. 1927–1930 (1989).

Leon, S. et al., "Evaluation of Resins for On–Bead Screening: A Study of Papain and Chymotrypsin Specificity Using Pega–Bound Combinatorial Peptide Libraries", *Bioorg. & Med. Chem. Lett.,* vol. 8, pp. 2997–3002 (1998).

Meldal, M. et al., "Anthranilamide and Nitrotyrosine as a Donor–Acceptor Pair in Internally Quenched Fluorescent Substrates for Endopeptidases: Multicolumn Peptide Synthesis of Enzyme Substrates for Subtilisin Carlsberg and Pepsin", *Anal. Biochem.* vol. 195, pp. 141–147 (1991).

Meldal, M. et al., *Innovation and Perspectives in Solid Phase Synthesis,* R. Epton, Mayflower Worldwide Ltd., Kingswinford, pp. 259–266 (1995).

Meldal, M. et al., "Direct Visualization of Enzyme Inhibitors Using a Portion Mixing Inhibitor Library Containing a Quenched Fluorogenic Peptide Substrate. Part 1. Inhibitors for Subtilisin Carlsberg", *J. Chem. Soc., Perkin Trans., I,* pp. 1591–1596 (1995).

Meldal, M. et al., "Inhibition of Cruzipain Visualized in a Fluorescence Quenched Solid–Phase Inhibitor Library Assay. D–Amino Acid Inhibitors for Cruzipain, Cathepsin B and Cathepsin L", *J. Pept. Sci,* vol. 4, pp. 83–91 (1998).

Merrifield, R.B. et al., "Solid Phase Peptide Synthesis. I. The Synthesis of A Tetrapeptide[1]", *J. Am. Chem. Soc.,* vol. 85, No. 14, pp. 2149–2154 (1963).

Ohlmeyer, M.H.J. et al., "Complex Synthetic Chemical Libraries Indexed with Molecular Tags", *Proc. Natl. Acad. Sci. USA,* vol. 90, pp. 10922–10926 (1993).

Rademan, J. et al., "SPOCC: A Resin for Solid–Phase Organic Chemistry and Enzymatic Reactions on Solid Phase", *J. Am. Chem. Soc.,* vol. 121, pp. 5459–5466 (1999).

Renil, M. et al., "POEPOP and POEPS: Inert Polyethylene Glycol Crosslinked Polymeric Supports for Solid Synthesis", *Tetrahedron Lett.,* vol. 37, pp. 6185–6188 (1996).

Sarkar, S.K. et al., "An NMR Method to Identify Nondestructively Chemical Compounds Bound to a Single Solid–Phase–Synthesis Bead for Combinatorial Chemistry Applications", *J. Am. Chem. Soc.,* vol. 118, pp. 2305–2306 (1996).

Schneider, S.E. et al., "Coupling Rational Design with Libraries Leads to the Production of an ATP–Selective Chemosensor", *J. Am. Chem. Soc.,* vol. 122, pp. 542–543 (2000).

St. Hilaire, P.M. et al., "Fluorescence–Quenched Solid Phase Combinatorial Libraries in the Characterization of Cysteine Protease Substrate Specificity", *J. Comb. Chem.,* pp. 509–523 (1999).

Thompson, L.A. et al., "Synthesis and Applications of Small Molecule Libraries", *Chem. Rev.,* vol. 96, pp. 555–600 (1996).

Vágner, J. et al., "Novel Methodology for Differentiation of 'Surface' and 'Interior' Areas of Polyoxyethylene–polystyrene (POE–PS) Supports: Application to Library Screening Procedures", *Innovation and Perspectives in Solid Phase Synthesis,* R. Epton, Mayflower Worldwide Limited, Kingswinford, Engand, pp. 347–352 (1994).

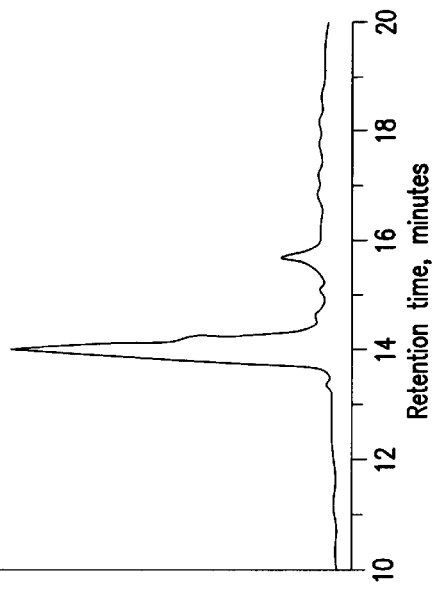
FIG. 2A
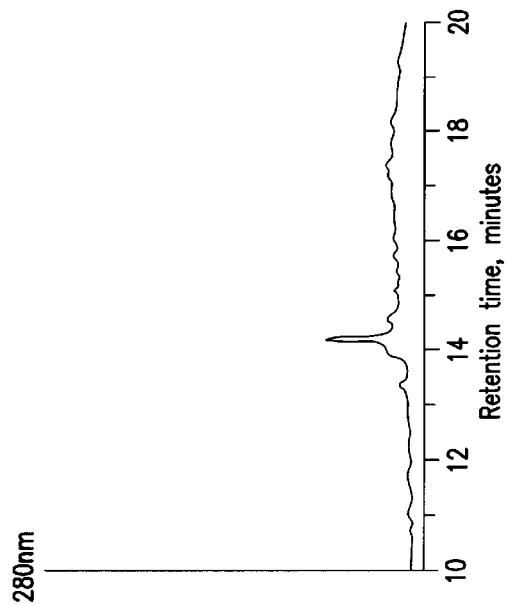
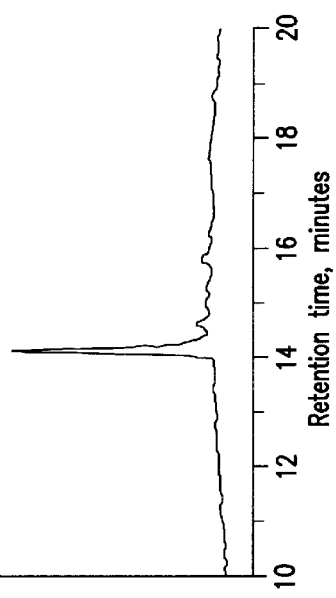
FIG. 2B
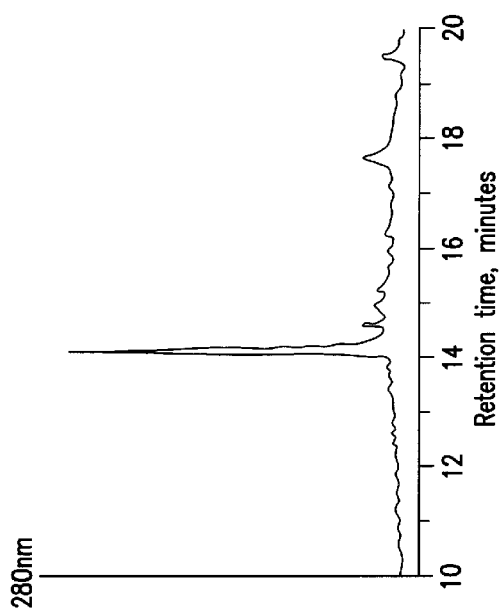

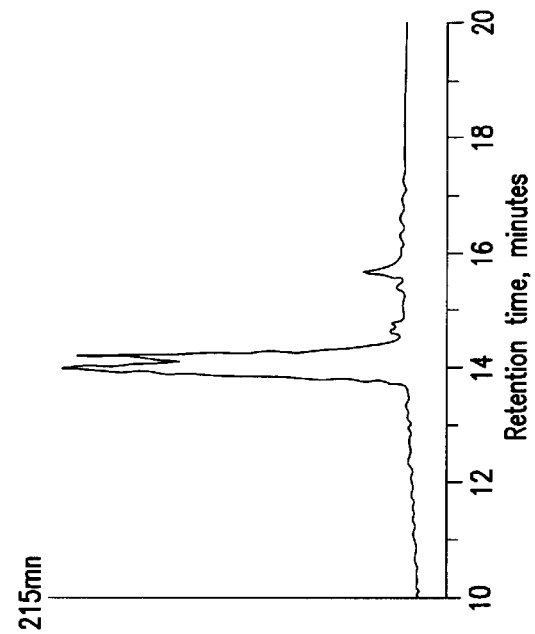
FIG. 2C
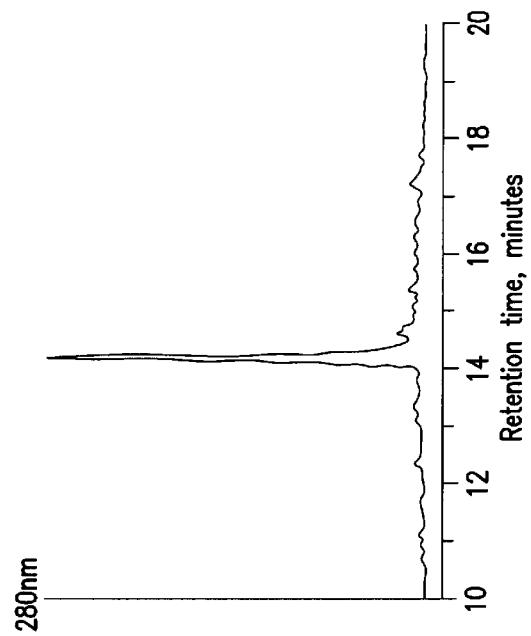
FIG. 2D
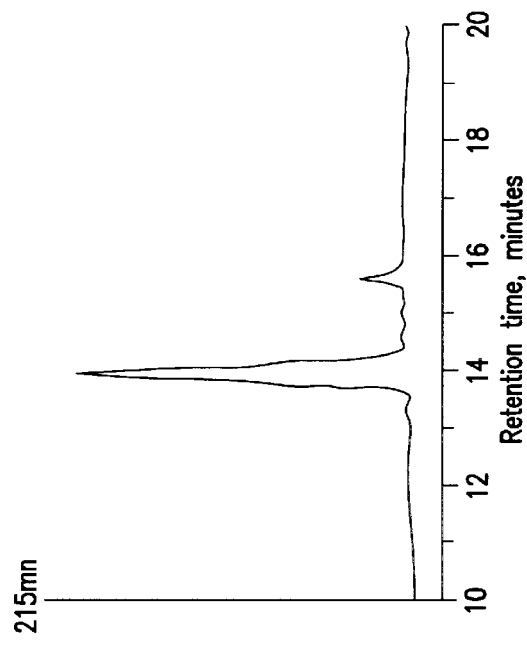
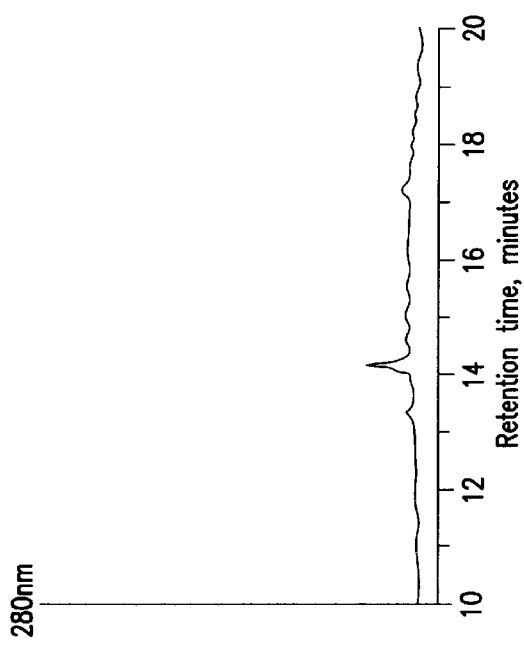

HYDROXY AND AMINE FUNCTIONALIZED RESINS

FIELD OF THE INVENTION

The invention provides a star-block, polyethylene glycol based polymeric material having a uniform distribution of both hydroxy and amine functional groups throughout the resin. The invention also provides methods for making and using the star-blocked polymeric material.

BACKGROUND OF THE INVENTION

Solid supports are increasingly used in organic synthesis, spectroscopic analysis, solid phase screening, chromatographic separations, and enzymatic assays. Suitable solid supports are typically polymeric resins that are chemically inert under a wide range of reaction conditions, mechanically stable, and compatible with a variety of solvents with differing polarity. No single resin has been developed that is compatible with all types of reactions or with all types of applications.

Solid supports are particularly useful with combinatorial or orthogonal chemistry for synthesizing large libraries of organic compounds. For example, large libraries of compounds that can be evaluated as new drugs can be prepared using solid supports with combinatorial or orthogonal chemistry. Solid supports simplify product isolation and allow the use of excess reagents to force reactions to completion.

The most common solid supports for solid-phase organic synthesis are spherical resin beads of either highly cross-linked gel type polystyrene polymers containing about 1 to 2 weight percent divinylbenzene or polyethylene glycol (PEG) grafted polystyrene copolymers. The polystyrene resins do not swell in polar protic solvents such as alcohols and water. Accessibility to all reaction sites can be compromised. The PEG grafted resins such as TentaGel™ (Rapp Polymere GmbH; Tübingen, Germany) and ArgoGel™ (Argonault Technologies; San Carlos, Calif.) tend to have relatively uniform swelling in a variety of solvents ranging from toluene to water. However, these resins have limited use with enzymatic reactions.

Other PEG-based solid supports have been developed. For example, poly(ethylene glycol)-poly(acrylamide) (PEGA) was the first resin compatible with both aqueous solutions and enzymatic reactions. The family of PEG-based resins has been extended to include polyoxyethylene-polyoxypropylene (POEPOP), polyoxyethylene-polyoxetane (SPOCC), and polyoxyethylene-polystyrene (POEPS-3) resins that have similar compatibility with aqueous enzymatic chemistry.

PEG-based resins have been used in on-bead assays for the determination of inhibitors of proteolytic enzymes, where two different compounds (the substrate and the inhibitor) on a single bead compete for the enzyme (the one-bead-two-compounds concept). To attach two compounds to one bead, bifunctional resins are needed. Previously, bifunctionality has been accomplished by derivatisation of a monofunctional resin with a mixture of two different linkers or by using an orthogonal protecting strategy on $N^\alpha$ and $N^\epsilon$ of lysine. Bifunctional resins are commercially available such as bifunctional TentaGel™ but the bifunctionality is not evenly distributed throughout the bead.

SUMMARY OF THE INVENTION

The invention relates to a polyethylene glycol (PEG) based polymeric material having a uniform distribution of both hydroxy and amine functional groups throughout the resin. The polymeric materials, known as HYDRA resins, are prepared by initially forming a polyimine compound through reaction of an aldehyde and an amine. The polyimine is further reacted with a reducing agent to form a star-blocked polymeric material with two types of functional groups.

In one embodiment of the invention, the aldehyde is prepared by partially oxidizing the hydroxy end groups of a polyethylene glycol. The amine is a branched compound having three or more primary amine groups. The aldehyde and amine groups react to form a polyimine. The polyimine is reduced to form a HYDRA resin containing PEG chains cross-linked with a branched amine.

In another embodiment of the invention, the aldehyde is a compound containing three to six aldehyde groups and functioning as a cross-linker. The aldehyde is reacted with a PEG having two amine end groups. The aldehyde and amine groups react to form a polyimine that is subsequently reduced to form a HYDRA resin.

The bifunctional HYDRA resin can be used in a broad range of solvents and under a variety of chemical reaction conditions. The resins can be permeated by large biomolecules such as enzymes. The difference in reactivity between the hydroxy and amine groups allows the HYDRA resin to be used as a solid support for combinatorial chemistry, chromatographic separations, immobilization of biomolecules, and controlled release of drugs. The polymeric material can be used in a polymeric coating or film, in an implant, or as an adsorbent.

BRIEF DESCRIPTION OF THE DRAWINGS

FIG. 2 are chromatograms of a substrate for Subtilisin Carlsberg endoprotease recorded at 215 nm (top) and 280 nm (bottom). FIG. 2a was obtained before enzymatic cleavage of the substrate from HYDRA resins; FIG. 2b was obtained after enzymatic cleavage of the substrate from PEG resin; FIG. 2c was obtained after enzymatic cleavage of the substrate from HYDRA resin; and FIG. 2d was obtained after enzymatic treatment of the substrate in the presence of an inhibitor on the hydroxy functional group of HYDRA resin.

DETAILED DESCRIPTION OF THE INVENTION

Figure 1:
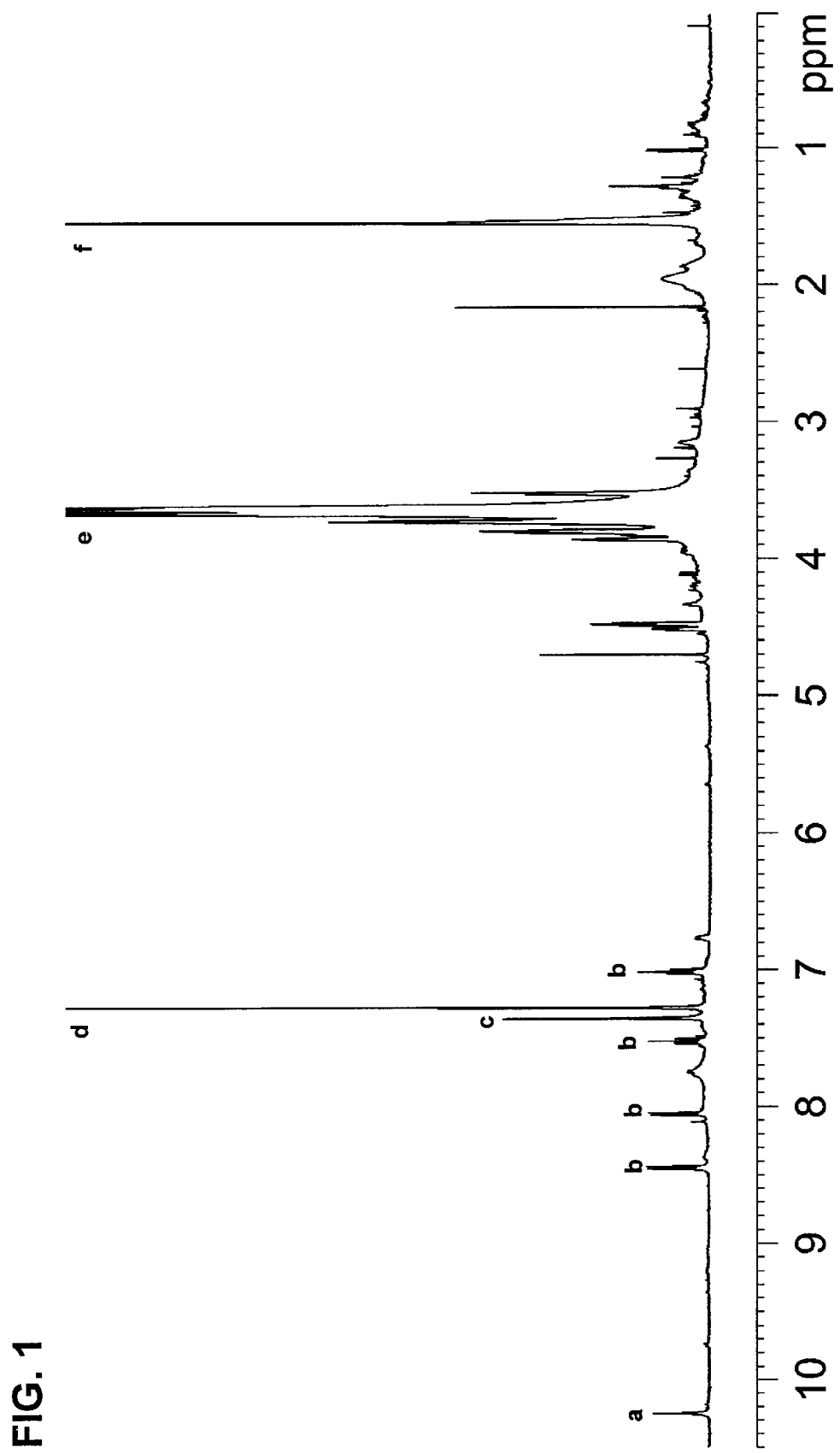
FIG. 1 is the $^1$H MAS nanoprobe NMR (500 MHz) spectrum of HYDRA resin derivatived with 2-(N-tert-butoxycarbonylamino)benzoic acid (Boc-Abz).

The invention provides a polyethylene glycol based polymeric material having both amine and hydroxy functionality. The polymeric material, known as HYDRA (hydroxy and amine functionalised resin), possesses an even distribution of the functional groups throughout a star-block polymeric matrix. The invention also provides methods of making and using the HYDRA polymeric material.

The HYDRA resins are prepared by forming a polyimine compound through the reaction of an aldehyde and an amine. The polyimine is then reacted with a reducing agent to form a star-blocked polymer having both amine and hydroxy functionality. Star-block polymers are also referred to as radial copolymers.

In one embodiment of the invention shown in Scheme 1, the aldehyde is prepared by partially oxidizing the hydroxy end groups of a native polyethylene glycol. As used herein, the term "native PEG" refers to a PEG having two hydroxy end groups. The amine is a branched compound having three or more primary amine groups. The aldehyde and amine groups react to form a polyimine containing PEG chains cross-linked with amine branching units.

about 3:2 to about 2:3, corresponding to a native PEG that is about 40 to 60 percent oxidized. In other embodiments, the ratio of hydroxy to aldehyde end groups is about 1:1, corresponding to a native PEG that is about 50

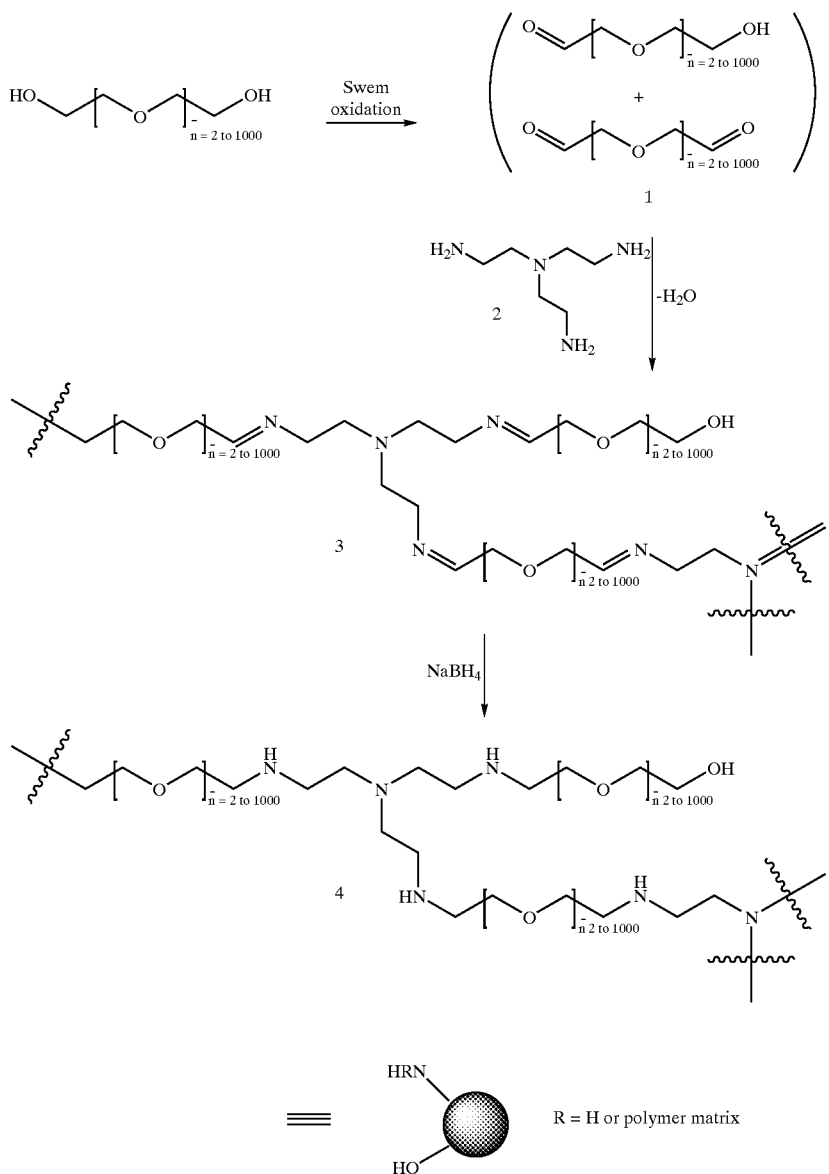

Scheme 1 percent oxidized. Changing the percent oxidation affects the degree of cross-linking and the ratio of hydroxy to amine groups in the HYDRA resin. For example, using a less oxidized PEG results in the formation of a HYDRA resin with less cross-linking and a higher level of hydroxy functionality.

The native PEG that is used to prepare the aldehyde typically contains from 2 to about 1000 ethylene glycol units and has hydroxy end groups. In one embodiment of the invention, the PEG contains from about 20 to about 45 ethylene glycol units. The size of the polyethylene glycol chain affects the size of enzymes that can permeate the polymer. For example, a PEG chain containing an average of about 32 ethylene units can be permeated by 10 enzymes up to about 40 killiDaltons (kD).

To prepare a polymeric material having a comparable number of hydroxy and amine groups, about 50 percent of the hydroxy end groups of the PEG are oxidized. The partially oxidized PEG is, in theory, a 1:2:1 mixture of native PEG, PEG mono-aldehyde, and PEG bis-aldehyde.

The partially oxidized PEG typically has a ratio of hydroxy to aldehyde end groups in the range of about 3:1 to about 1:3. This corresponds to a native PEG that is about 25 percent to about 75 percent oxidized. In some embodiments, the ratio of hydroxy to aldehyde end groups ranges from The PEG hydroxy end groups can be oxidized, for example, with oxalyl chloride and DMSO (Swern oxidation). The preferred solvent is a mixture of dichloromethane (CH$_2$Cl$_2$) and carbon tetrachloride (CCl$_4$). Using a 1:1 ratio of CH$_2$Cl$_2$ and CCl$_4$ at a temperature in the range of about −78° C. to −40° C., the PEG end groups are about 40 to about 60 percent oxidized. The yield of the PEG aldehyde is typically in the range of about 85 to 95 percent.

The amine is a branched compound having three or more primary amine groups. Suitable amines include, for example, compounds having the formula (NH$_2$—(CH$_2$—)$_n$—CH$_2$—)$_m$X where n is an integer of 0 to 7, m=3, and X is either N or CH; or n is an integer of 0 to 7, m=4, and X is C. In one embodiment of the invention, the amine is tris(2-aminoethyl)amine or a similar branched amine.

The molar ratio of the amine cross-linker to the PEG aldehyde can be varied to prepare HYDRA resins containing different ratios of hydroxy to amine functionality. The molar ratio typically varies from about 1:10 to about 10:1. In some embodiments, the ratio varies from about 3:7 to about 7:3.

A suitable solvent for the polymerisation reaction is a mixture of water and acetonitrile. The rate of polymerisation in pure acetonitrile is too rapid (about one to five seconds) to guarantee complete mixing of reagents, even at low temperature. Slower polymerisation rates can be obtained by addition of water. For example, addition of 20 volume percent water based on the total solvent volume increases the polymerisation time to about three minutes at room temperature. About 1 to 2 cm$^3$ solvent per gram of PEG material is typically used.

The cross-linked polyimine resin 3 in Scheme 1 is typically cured for about one hour and then placed under high vacuum to remove solvent. The dried polyimine resin can be chopped into smaller pieces and treated with a strong reducing agent. After complete reduction, the resin can be pushed through a mesh and washed, yielding a mechanically stable, almost colourless resin.

Suitable reducing agents include borohydrides such as NaBH$_4$, NaCNBH$_4$, or NaBH$_n$(OR$_1$)$_m$ wherein m is an integer in the range of 1 to 3, n is an integer equal to (4−m); and R$_1$ is an alkyl, aryl, or acyl group. In one embodiment of the invention, NaBH$_4$ in a mixture of methanol (MeOH) and dimethyl formamide (DMF) is used as the reducing agent.

The hydroxy functionality in the HYDRA resin originates from non-oxidized PEG end groups as well as from aldehyde moieties that do not react with an amine but that react with the reducing agent to produce an alcohol. The amine functionality in the HYDRA resin originates from secondary amines formed by polyimine reduction as well as from primary amines that do not react with the aldehyde to form a polyimine. Incomplete polyimine formation is particularly likely for resins polymerised using an excess of the amine compound.

In another embodiment of the invention, the aldehyde is a compound containing three to six aldehyde groups and functioning as a cross-linker. The aldehyde compound reacts with a PEG having two amine end groups forming a polyimine. The polyimine is reduced to form a star-blocked polymeric matrix containing cross-linked PEG chains.

Suitable aldehyde compounds containing three to six aldehyde groups include aryl compounds such as benzene-1,3,5-tricarbaldehyde. Other suitable aldehyde compounds include C((CH$_2$)$_n$CHO)$_4$ where n is an integer ranging from 0 to 4, CH$_3$C((CH$_2$)$_m$CHO)$_3$ where m is an integer ranging from 0 to 4, C$_6$H$_3$((CH$_2$)$_p$CHO)$_3$ where p is an integer ranging from 0 to 4, and the like.

The PEG with amine end groups can be prepared, for example, by reacting an aziridine with native PEG forming a β-amino ether end group. The amine end groups can also be formed by reducing a PEG having two azide end groups. The azide end groups can be formed, for example, by initially reacting the native PEG with thionyl chloride in dichloromethane followed by precipitation from ether to form a PEG with chloride end groups. The chloride end groups can be replaced by reaction with sodium azide in DMF.

The native PEG typically contains from 2 to about 1000 ethylene glycol units and has hydroxy end groups. In one embodiment of the invention, the PEG contains from about 20 to about 45 ethylene glycol units.

The molar ratio of the aldehyde cross-linker to the PEG with amine end groups can be varied to prepare HYDRA resins containing different ratios of hydroxy to amine functionality. The molar ratio typically varies from about 1:10 to about 10:1. In some embodiments, the ratio varies from about 3:7 to about 7:3.

In this embodiment of the invention, the hydroxy groups originate from aldehyde groups that do not react with an amine but react with the reducing agent. The amine groups originate from any unreacted primary amine groups on the PEG chain as well as secondary amines formed from reduction of the polyimine.

The HYDRA resins comprise polyethylene glycol chains cross-linked with a branching compound to form a star-block polymer having both amine and hydroxy functional groups, wherein the polyethylene glycol chains contain 2 to about 1000 ethylene glycol units. This structure is different than that of various other resins used for solid supports such as polystyrene, polystyrene grafted with PEG, poly(ethylene glycol)-poly(acrylamide) (PEGA), polyoxyethylene-polyoxetane (SPOCC), polyoxyethylene-polyoxypropylene (POEPOP), and polyoxyethylene-polystyrene (POEPS-3).

The bifunctional HYDRA support can be used in a broad range of solvents. The resins swell more in solvents such as water, dichloromethane, and dichloromethane containing acetic acid than in solvents such as toluene, methanol, tetrahydrofuran, and dimethyl formamide. Swelling is dependent on the molecular weight of the resin and the extent of cross-linking.

HYDRA resins typically have good solvation in water and large biomolecules such as enzymes can penetrate the matrix. In solvents such as toluene, methanol, tetrahydrofuran, and dimethyl formamide, the swelling in typically about 3 to 4 cm$^3$ per gram of resin for resins prepared using a native PEG having an average molecular weight of about 1500 gram. This swelling is typically less than with resins such as POEPOP, SPOCC or POEPS-3 prepared from the same average molecular weight native PEG (see Grøtli et al., *J. Comb. Chem.*, 2: 108–118 (2000)). The lower swelling of HYDRA resins can be an advantage because it can result in improved mechanical stability. Further, because less solvent is required, the reagents used with the resins can be more concentrated.

A higher aldehyde to amine ratio typically results in the formation of a polymeric network with less cross-linking. Lower cross-linking generally results in increased resin swelling in solvents. The affect is most pronounced with solvents such as water, dichloromethane, and dichloromethane containing acetic acid.

The HYDRA resins are chemically stable under a variety of reaction conditions. For example, the resins can be used under strong alkaline conditions such as required for ester hydrolysis. The resins can be used with strong bases such as required for the removal of various protective groups such as tert-butoxycarbonyl (Boc) or with Lewis acids as required for glcosylation reactions. Additionally, the resins can be used under acylating conditions as required for ester or amide bond formation.

The amine and hydroxy loadings both range from about 0.1 to about 1 mmoles per gram. As used herein, the term "loading" refers to the millimoles (mmoles) of functional group present per gram of resin. The total loading typically ranges from about 0.2 to about 2 mmoles per gram. The loading is dependent on the average molecular weight of the native PEG chain. For example, HYDRA resins prepared using a polyethylene glycol resin having an average molecular weight of about 1500 grams ($PEG_{1500}$) typically have a total loading that is greater than about 1 mmoles per gram with the amine and hydroxy loadings both ranging from about 0.2 to about 0.8 mmoles per gram.

The loading of the HYDRA resin is typically greater than that of other PEG based resins prepared form the same molecular weight native PEG. For example, the average loading is typically close to about 1.1 mmol per gram for HYDRA prepared from PEG $_{1500}$ compared to about 0.2 to 0.6 mmol per gram for resins such as POEPOP, SPOCC or POEPS-3 prepared from the same average molecular weight native PEG (see Grøtli et al., *J. Comb. Chem.*, 2:108–118 (2000)). Increasing the aldehyde to amine ratio results in the formation of a resin having an increased hydroxy loading and a decreased amine loading. The total loading of the HYDRA resins is generally close to the theoretical value.

Another aspect of the invention provides a method of organic synthesis comprising using HYDRA resins as solid supports. In one embodiment, the difference in reactivity between hydroxy and amine functional groups allows the HYDRA resin to be used as a solid support for combinatorial chemistry. For example, HYDRA resins can be used in various other solid phase techniques, such as tagging, where a chemical tag or bar code is anchored to one functional group of the solid support and a combinatorial ligand is attached to the other functional group. The tag or bar code can be analysed to determine the reaction sequence used to produce the combinatorial ligand on the other functional group.

Magic Angle Spinning (MAS) NMR is becoming an increasingly important analysis tool in solid phase chemistry. The technique allows analysis of a compound without cleavage from the resin. HYDRA resins can be used with MAS NMR to analyse ligands attached to either the amine or hydroxy functional groups. The line widths and multiplet resolution of spectra for attached ligands are typically as good or better that those obtained with other resins such as, for example, PEOPOP, SPOCC, or PEOPS-3 prepared from the same average molecular weight PEG (see Grøtli et al.,*J. Comb. Chem.*, 2: 108–118 (2000)). A possible explanation for the improved spectral quality compared to these other PEG based polymers is that the star-block structure is a more chemically homogenous polymer network than a polymeric structure having a backbone segment.

HYDRA resins can be used for the immobilization of various biomolecules. The invention provides a method of bioassay comprising a HYDRA resin and one or more ligands attached to the amine functionality, the hydroxy functionality, or both the amine and hydroxy functionalities of the polymeric material. Changes to the ligand resulting from enzymatic activity or binding can be monitored. For example, HYDRA resin can be used for enzymatic assays. This was demonstrated by attaching a substrate for 27 kDa endoprotease Subtilisin Carlsberg (see Meldal et al., *J. Chem. Soc., Perkin Trans.* 1, 1591–1596 (1995)) to the amine functional groups. The substrate was enzymatically cleaved by this endoprotease. The endoprotease was able to penetrate the polymer matrix. Attachment of an inhibitor on the hydroxy functionality impeded enzyme activity.

The invention provides a pharmaceutical composition comprising HYDRA resin and one or more therapeutic agents attached to the amine functionality, the hydroxy functionality, or to both the amine and hydroxy functionalities of the polymeric material. The HYDRA resins can serve as a carrier for drugs and for controlled release of drugs. For example, a peptide with a proteolytic cleavage site can be used to link a toxic substance to the support. The drug will release only when a tissue specific protease characteristic for the diseased tissue such as a tumor is present. In addition to the drug, the beads can also carry a molecule targeted for a specific receptor on that tissue leading to adherence of the beads carrying the drug on the surface of the tissue.

The invention provides a method for separating two or more compounds comprising preparing a chromatographic resin comprising the HYDRA resin. Such resins can be used in a wide range of different solvents to separate molecules based on size or other characteristics such as polarity. For example, the resin can be used in gel permeation chromatography. The star-blocked polymeric network is well suited for rapid diffusion of various reagents throughout the resin.

Because of the resins have good swelling in a variety of solvents and the salvation energy of the swelled resin is fairly high, the resins can be used as an absorbent. The polymeric material can also be used in a polymeric coating or film and in a medical implant.

The following examples further describe the invention. The examples are provided for exemplary purposes to facilitate understanding of the invention and should not be construed to limit the invention to the examples.

EXAMPLES

Chemicals

All solvents were anhydroscan-grade from Labscan and were used as purchased. Unless indicated, chemicals were obtained from Fluka or Aldrich. Tris(2-aminoethyl)amine (95% purity) was from Fluka and used without any further purification. N-[(1H-benzotriazol-1-yl)-(dimethylamino)-methylene]-N-methylmethan-aminium tetrafluoroborate N-oxide (TBTU), 2,4,6-mesitylenesulfonyl-3-nitro-1,2,4-triazolide (MSNT), hyroxymethylbenzoic acid (HMBA), and 9-fluorenylmethoxycarbonyl (Fmoc) amino acids as well as the corresponding pentafluorphenyl (Pfp) esters were from Bachem (Switzerland) or NovaBiochem (Switzerland). Subtilisin Carlsberg was from NOVO Industries (Denmark). $PEGA_{800}$ was from Polymer Laboratories (UK). $PEG_{1500}$ was purchased from Fluka and was dried (determined by Karl-Fischer titration) by stirring 20–40 g portions of this material at 100° C. in vacuo for about two hours.

The photolabile linker was prepared as described by Holmes et al. in *J. Org. Chem.*, 60: 2318–2319 (1995). 2-methoxy-4-acetylphenol was treated with Br—$(CH_2)_3$—$CO_2CH_3$ and $K_2CO_3$ in DMF and the product was reacted with excess hydroxylamine hydrochloride/pyridine/H2O. The oxime formed was reduced with H2/Pd/C in acetic acid and the resulting amine trifluoroacetylated with the anhydride in pyridine. The product was crystallized from ethanol water (80% four steps). The product was nitrated with concentrated nitrous acid in acetic acid (86%). The protecting groups were removed by reflux in NaOH/MeOH/H2O and the crude product was reacted with Fmoc chloride (81%). 4-[(tert-butyldimethylsiloxy)methyl]benzoic acid (TBDMS-HMBA) was prepared as described by Kita et al. in *J. Org. Chem.*, 51: 4150–4158 (1986). 4-(hydroxymethyl)-benzoic acid (0.76 g, 5 mmol) was reacted with tert-butyldimethylsilyl chloride (2.29 g, 15 mmol) and imidazole (2.04 g, 30 mmol) in dry DMF (12 mL). Aqueous workup gave (0.86 g) 65% yield of the 4-[(tert-butyldimethylsiloxy)methyl]benzoic acid with melting point 157–159° C., δppm 8.06 (d, J=8 Hz); 7.39(d, J=8 Hz); 4.78 (s); 0.94 (s); 0.11 (s).

Fmoc-Lys(Boc-Abz)-OH was prepared according to the procedure described by Meldal et al. in *Anal. Biochem.*, 195: 141–147 (1991). 2-tert-Butyloxycarbonylamino benzoate was synthesized by dissolving $Boc_2O$ (51.6 g, 236 mmol), anthranilic acid (1) (25.9 g, 189 mmol) and triethylamine (50 ml, 360 mmol) in DMF (50 ml). Within a few minutes gas evolution commenced and the mixture was left for a period of 24 hours at 20° C. until the gas evolution had ceased. Thin Layer Chromatography (TLC) in EtOAc showed the reaction to be complete.

The DMF was removed and the residue was dissolved in dichloromethane (200 ml) and extracted with 10% sodium carbonate solution (100 ml). The dark-brown aqueous phase was extracted with dichloromethane and discarded. The combined organic phase was extracted three times with 100 ml of water. The aqueous extractions were acidified to pH 2 and extracted with diethyl ether (3×100 ml). After drying with sodium sulfate and filtration the volume was reduced to 100 ml and petroleum ether was added until the product crystallized. The crude material was recrystallized from 50% aqueous ethanol to give 26 g (60%) of pure Boc-anthranilic acid, mp 149–150° C. Analysis: Calculated for $Cl_2H_{15}NO_4$: C, 60.75, H, 6.37, N, 5.90%. Found: C, 60.72, H, 6.37, N, 6.02%. tHNMR (CDC13): δppm (J, Hz); Boc, 1.54; H3, 8.11 (7.7); H4, 7.57 (7.7, 7.5); H5, 7.04 (7.5, 8.4); H6, 8.48 (8.4); Boc, COOH, 10.02.

The BocABz was activated with TBTU (1 eqv)/NEM and reacted with Fmoc-Lys(.HCl)-OH in DMF. The DMF was removed in vacuo and the Fmoc-Lys(Boc-Abz)-OH was purified by silica gel column chromatography to give 45% of pure product as an oil which characterized by MS and NMR spectroscopy.

NMR Characterization $^1$NMR spectroscopic analysis of PEG aldehyde was performed at 250 MHz in $CDCl_3$, and recorded on a Bruker DPX 250 MHz instrument. Proton shifts are downfield from TMS (0.00 ppm) as internal standard. A 32 second presaturation delay was employed. $^1$H MAS NMR was recorded on a Varian Unity Inova 500 MHz spectrometer equipped with a 4 mm $^1$H-observe nano NMR probe at 25° C. using a spin rate of approximately 2 kHz. Resin particles were transferred into a nanotube and dried overnight in vacuo. $CDCl_3$ (40 μL) was added. The spectrum was recorded as a one-pulse experiment with presaturation of the main PEG resonance. Acquisition data for the spectrum was as follows: 2.0 seconds acquisition time, 2.0 seconds presaturation delay, sweep width of 8000 Hz.

Example 1

Preparation of $PEG_{1500}$aldehyde 1

Oxalyl chloride (1.65 cm³, 19.2 mmol) was dissolved in a mixture of dichloromethane and carbon tetrachloride ($CH_2Cl_2$:$CCl_4$ 1:1, 90 cm³) under argon and cooled to −47° C. Dimethylsulfoxide (DMSO) (2.90 cm³, 40.8 mmol) in $CH_2Cl_2$:$CCl_4$ (1:1, 9 cm³) was slowly added over 3 minutes, and stirred for an additional 6 minutes. Dried $PEG_{1500}$ (7.20 g, 4.8 mmol) dissolved in $CH_2Cl_2$:$CCl_4$ (1:1, 30 cm³) was added over 1 hour using a syringe pump. The mixture was stirred at −47° C. over night, treated with triethanolamine (TEA) (10 cm³, 71.7 mmol), and allowed to warm to ambient temperature. Water (10 cm³) was added and the mixture was concentrated in vacuo. The resulting residue was diluted with water (20 cm³) and extracted with $CH_2Cl_2$ (3 times using 50 cm³). The extracts were dried over magnesium sulfate and concentrated to an oily residue to which ethyl ether (100 cm³) was added with stirring for 2 hours. The white precipitate was filtered and dried in vacuo.

Yield: 6.83 g (4.5 mmol, 95%).

Based on $^1$H-NMR, the polymer was 46% oxidized. $^1$H-NMR ($CDCl_3$, 250 MHz) δ9.74 (0.92 H, t, J=0.8, aldehyde), 4.16 (1.84 H, d, J=0.8, $CH_2CHO$), 3.64 (130 H, s, $[CH_2O]_{65}$).

Example 2

Preparation of HYDRA Resins

Five HYDRA resins were prepared: 4a (3:7 aldehyde to amine ratio), 4b(4:6 aldehyde to amine ratio), 4c (1:1 aldehyde to amine ratio), 4d(6:4 aldehyde to amine ratio), and 4e (7:3 aldehyde to amine ratio). The procedure is described in detail for 4c.

PEG aldehyde 1 (200 mg, 133 μmol aldehyde) from Example 1 was dissolved in acetonitrile (MeCN) (120 μL) and water (30 μL) under argon and cooled to 0° C. in an ice bath. Tris(2-aminoethyl)amine 2 (6.8 mg, 133 μmol $NH_2$) dissolved in MeCN (50 μL) was added with stirring. After 5 minutes, the ice bath was removed and resin 3 was allowed to cure for 1 hour at ambient temperature. The resin was lyophilised over night, cut into smaller lumps (about 3×3 mm) and treated with 0.5 M $NaBH_4$ in dimethyl formamide (5 cm³, DMF:MeOH 1:1) over night. Water was added (5 cm³) and the resin was pushed through a 1×1 mm mesh sieve. The resulting granulated resin 4c was washed with MeCN (3 times) and $CH_2Cl_2$ (3 times) and then dried in vacuo. Yield: 158 mg (79%) colourless resin.

The yields for the samples prepared with different ratios of aldehyde to amine were 94% for 4a, 92% for 4b, 83% for 4d, and 46% for 4e.

The procedure was easily scaled up to gram scale.

Example 3

Swelling of HYDRA Resins

Swelling was determined for resins 4a, 4b, 4c, 4d, and 4e in a broad range of solvents using the syringe technique. A weighed amount of the resin was placed in a syringe barrel syringe having a sintered Teflon filter. A flow of solvent was passed through the syringe. The volume of the resin bed was measured. The excess solvent was then drained from the syringe by placing a 4.5 kg (10 lb.) weight on the inserted syringe piston (diameter 1.25 cm, 0.5 inch). The weight was removed, the resin was allowed to expand, and the value measured was used to calculate the swelling.

As shown in Table 1, resin swelling was measured in the following solvents: toluene, methanol, tetrahydrofuran (THF), dimethylformamide (DMF), water, dichloromethane and a mixture of dichloromethane and acetic acid (95:5 $CH_2Cl_2$:AcOH)

TABLE 1

Swelling of HYDRA Resins in Various Solvents

| | Example | | | | |
|---|---|---|---|---|---|
| | 4a | 4b | 4c | 4d | 4e |
| Toluene | 3.0 | 3.1 | 3.3 | 3.1 | 2.6 |
| Ethanol | 3.6 | 3.5 | 3.0 | 4.1 | 4.3 |
| Tetrahydrofuran | 3.5 | 3.8 | 4.0 | 4.6 | 5.3 |
| Dimethylformamide | 3.3 | 3.7 | 4.0 | 4.6 | 5.4 |
| Water | 5.5 | 5.4 | 5.9 | 6.9 | 8.6 |
| Dichloromethane | 4.9 | 5.5 | 6.2 | 7.4 | 10.0 |
| dichloromethane:acetic acid (95:5) | 6.7 | 7.0 | 8.1 | 10.9 | 16.0 |

A higher aldehyde to amine ratio generally increased resin swelling. The trend was especially pronounced in water (increased from 5.5 to 8.6 cm$^3$ g$^{-1}$), dichloromethane (increased from 4.9 to 10 cm$^3$ g$^{-1}$), and dichloromethane containing 5% acetic acid (increased from 6.7 to 16 cm$^3$ g$^{-1}$).

The resins typically exhibited the most swelling in dichloromethane containing 5% acetic acid. In toluene, methanol, THF, and DMF, the resins exhibited moderate degrees of swelling (typically about 3 to 4 cm$^3$ g$^{-1}$).

Example 4

Stability Measurements

To determine the stability of the HYDRA resins under various reaction conditions, resins 4a–4e were subjected to treatment with aqueous 4 M NaOH, neat trifluoroacetic acid (TFA), aqueous 4 M HCl, neat acetic anhydride, and neat boron trifluoride etherate for two weeks. None of the resins dissolved, changed colour, or visibly swelled. The lack of change in these properties indicated that no bonds were broken.

Example 5

Loading Determination

Scheme 2 shows the reaction sequences used to determine the hydroxy and amine loading of the HYDRA resins.

Scheme 2

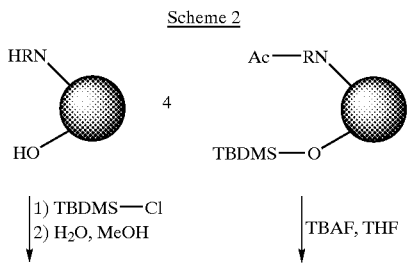

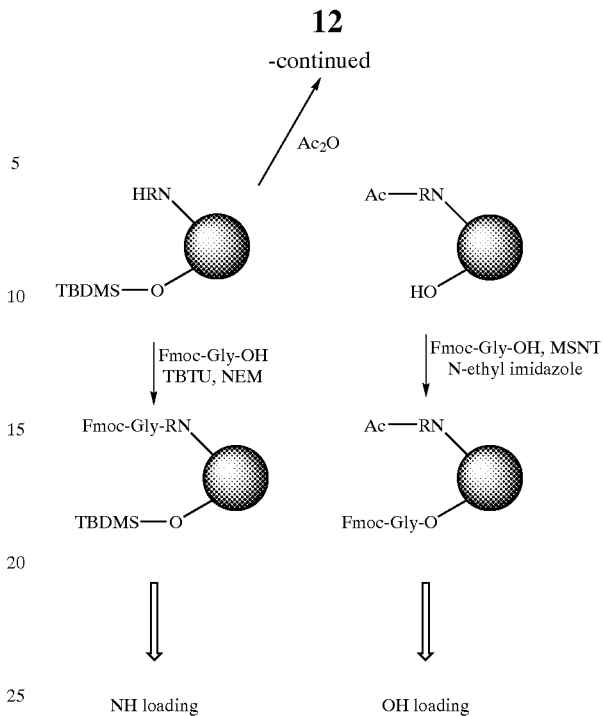

The hydroxy functionality was first capped by silylation with tert-butyldimethylsilyl chloride. Approximately 30 mg of each resin 4a–4e was treated overnight with a CH$_2$Cl$_2$ solution (600 µL) containing tetra-butyldimethylsilyl chloride (TBDMS-Cl) (0.5 M), 4-N,N-dimethylaminopyridine (DMA) (0.05 M), and triethylamine (TEA) (0.5 M). The resin was washed with CH$_2$Cl$_2$ (3 times), and MeOH (3 times). Silylated amine was subsequently hydrolysed with water (10 minutes). The resin was further washed with MeCN (3 time) and DMF (3 times) and then divided into two portions: Portion A and Portion B.

O-Silylation was performed as a precaution to avoid even minor amounts of acylation of the hydroxy functionality which can occur with subsequent treatment with N-[(1H-benzotriazol-1-yl)-(dimethylamino)-methylene]-N-methylmethan-aminium tetrafluoroborate N-oxide (TBTU) as the coupling reagent for determination of the amine loading. The amine was coupled with TBTU activated 2,4,6-mesitylenesulfonyl-3-nitro-1,2,4-triazolide (MSNT) glycine (Fmoc-Gly-OH) by treating Portion A over night with 500 µL DMF containing Fmoc-Gly-OH (0.5 M), TBTU (0.47 M) and N-ethyl morpholine (0.5 M). The resin was then washed with DMF (5 times), MeCN (3 times) and CH$_2$Cl$_2$ (3 times), and dried in vacuo.

The hydroxy loading was determined by capping the free amines of the O-silylated resin with acetic anhydride (Ac$_2$O). Portion B was treated with 2:4:4 Ac$_2$O:pyridine:DMF over night followed by washing with DMF (3 times), MeCN (3 times), and THF (3 times). The silyl group were removed by treating the resin with a mixture of tetra-butylammonium fluoride (TBAF) (1 M TBAF in THF) (500 µL, 0.5 mmol) and acetic acid (28 µL, 0.5 mmol) for 4 hours. The resin was washed with THF (3 times) and CH$_2$–Cl$_2$ (3 times) and then esterified with 2,4,6-mesitylenesulfonyl-3-nitro-1,2,4-triazolide (MSNT) activated by treatment with 500 µL CH$_2$Cl$_2$ containing Fmoc-Gly-OH (0.5 M), MSNT (0.5 M) and N-methyl imidazole (0.5 M) for 30 minutes. The resin was washed with CH$_2$Cl$_2$ (3 times) and coupled again with a fresh batch of reagents for 1 hour. The resin was washed with CH$_2$Cl$_2$ (3 times), 95:5 CH$_2$Cl$_2$:diisopropylethylamine (DIPEA), CH$_2$Cl$_2$ (3 times) and MeCN (3 times). The washed resin was dried in vacuo.

The Fmoc loading of Portions A and B were determined by Fmoc cleavage and optical density measurements at 290 nm. The loading was calculated using a calibration curve. After Fmoc loading determination, correction of the measured loadings to compensate for the mass of Fmoc glycine and acetyl groups was performed. Hydroxy and amine loadings were calculated from the Fmoc loadings by the following equation: Loading$_{Corrected}$=(Loading$_{Measured}^{-1}$−ΔM)$^{-1}$, where ΔM is the combined mass increase to the resin imposed by Fmoc-Gly, Ac and TBDMS. For X=OH, ΔM=0.321 g mmol$^{-1}$; for X=NH, ΔM=0.394 g mmol$^{-1}$. Corrected loadings of 4a–4e are shown in Table 2.

TABLE 2

Loading of HYDRA Resins

| Example | Total Loading (mmole/g) | Hydroxy Loading (mmole/g) | Amine Loading (mmole/g) |
|---|---|---|---|
| 4a | 1.21 | 0.33 | 0.88 |
| 4b | 1.03 | 0.47 | 0.56 |
| 4c | 0.96 | 0.59 | 0.37 |
| 4d | 1.05 | 0.77 | 0.28 |
| 4e | 1.04 | 0.80 | 0.24 |

The resin loading could be tuned between 0.33 and 0.80 mmol hydroxy per gram and 0.88 and 0.24 mmol amine per gram by varying the monomer composition in the polymerisation mixture. The theoretical total loadings of 4a–4e, calculated on basis of the amount of amine and aldehyde used in the polymerisations, were in the range of 1.3 mmol per gram, a number which corresponds well with the observed total loadings.

Example 6

Magic Angle Spinning (MAS) NMR of HYDRA Resins

Resin 4c was N-acylated with 2-(N-tert-butoxycarbonylamino)benzoic acid (Boc-Abz) and studied using Magic Angle Spinning NMR. The spectra is in FIG. 1.

Boc-Abz-OH (6.2 mg, 26 μmol), TBTU (9.0 mg, 24 μmol) and N-ethyl morpholine (3.8 μL, 26 μmol) were mixed in DMF (200 μL), incubated for 10 min, and added to resin 4c (23 mg, 8.7 μmol NH). After 17 hours, the resin was washed with DMF (5 times) and CH$_2$Cl$_2$ (5 times) and then lyophilised. $^1$H MAS NMR (CDCl$_3$ 500 MHz) δ 10.22 (s, 1 H, ArNH), 8.45 (d, 1H, J=8, Abz), 8.05 (dd, 1H, J=8, 1.5, Abz), 7.52 (dt, 1H, J=8, 1.5, Abz), 7.02 (t, 1H, J=8, Abz), 3.64 (bs,[CH$_2$CH$_2$O]$_n$, 1.55 (s, Boc, water).

The spectral properties of the resin were quantified by three parameters: (i) general spectral quality as estimated visually; (ii) line width as measured using for the Boc singlet at 1.55 ppm; and (iii) the multiplet resolution as measured using the Abz aromatic proton doublet at 8.45 ppm and the degree of separation between the doublet peaks. In CDCl$_3$, the spectral quality was of high-resolution, and the line width was measured as 1.3 Hz; however, because the Boc signal was overlapped with the water peak, the observed value may be higher than the actual value. Nevertheless, the value is as good or better than the respective line width measured on similarly derivatised PEG$_{1500}$ based resins (POEPOP: 1.3 Hz, SPOCC: 1.8 Hz, and POEPS-3: 2.2 Hz) (see Grøtli et al., J. Comb. Chem., 2: 108–118 (2000)).

The multiplet resolution for Boc-Abz-4c was measured as 0.16 ppm, which is comparable to the value obtained for POEPOP (0.08 ppm), SPOCC (0.15 ppm) and POEPS-3 (0.18) (see Grøtli et al., J. Comb. Chem., 2: 108–118 (2000)). It should be noted that 256 scans were recorded for these comparative resins and only 64 scans were recorded for 4c. The line width and multiplet resolution of resin 4c was better than that reported for PEGA$_{1900}$, TentaGel, ArgoGel and PLASM (see Grøtli et al., J. Comb. Chem., 2: 108–118 (2000)).

The peaks in FIG. 1 correspond to the following chemical entities of Boc-Abz-4c: (a) ArNH; (b) Abz; (c) chloroform, resin interior; (d) chloroform, outside of resin; (e) [CH$_2$CH$_2$O], NCH$_2$CH$_2$N; and (f) Boc, water.

Example 7

Assembly of an Octameric Peptide Through the Amine Functionality and Decameric Peptide Through the Hydroxy Functionality The usefulness of the resins for peptide synthesis was demonstrated by the assembly of an octameric peptide through the amine functionality and a decameric peptide through the hydroxy functionality as shown in Scheme 3.

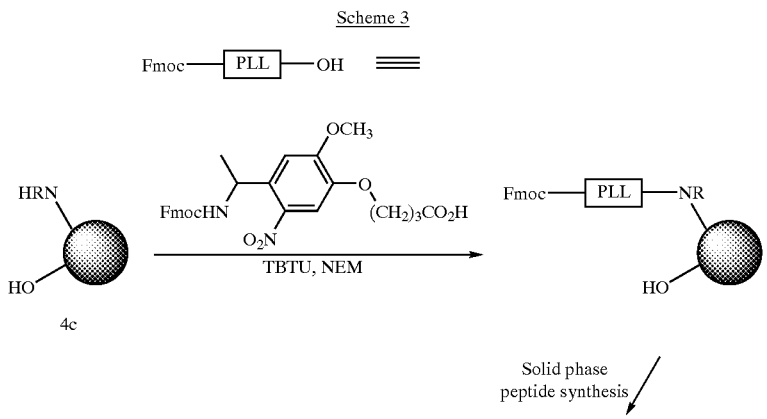

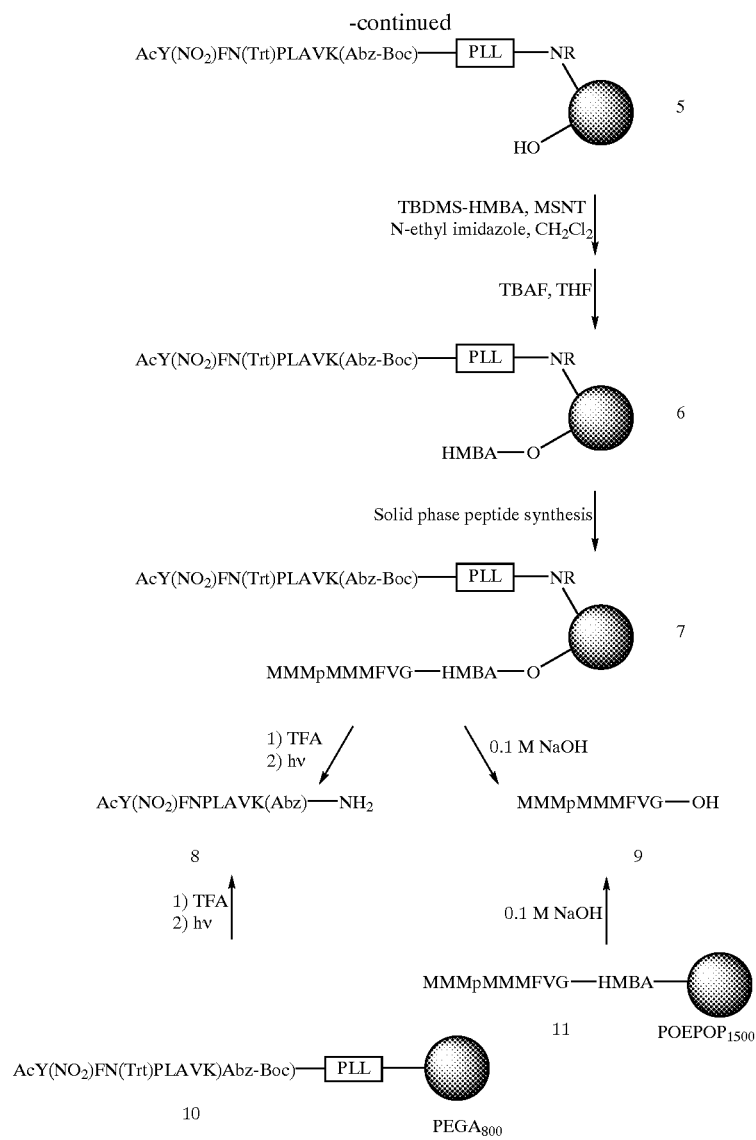

Peptide synthesis was accomplished using previous described procedures (see Atherton et al., *Solid Phase Peptide Synthesis—A Practical Approach*, IRL Press, Oxford (1989)).

A photolabile linker (PLL) protected with Fmoc was first attached to resin4c using TBTU and N-ethyl morpholine in DMF. The octameric peptide was then attached. In parallel, the same peptide sequence was assembled on PEGA resin with an average molecular weight of about 800 grams (PEGA$_{800}$). Comparison of the RP-HPLC traces of peptide 8 photolysed from the two resins showed no significant difference in purity (95% in both cases).

The hydroxy functionality of 5 was hereafter esterified with the base labile linker 4-hydroxymethyl benzoic acid (HMBA) to give 6, and a decameric peptide was assembled through this linker. Again, the synthesis was performed in parallel, this time on HMBA-POEPOP$_{1500}$. Cleavage of peptide 9 from resins 7 and 11 with 0.1 M NaOH and analysis by RP-HPLC showed that the purities of crude peptide 9 from these two resins were comparable (61% and 74%, respectively). The crude material cleaved from resin 7 was contaminated with a small amount of peptide 8. The presence of peptide 8 was probably caused by imperfect exclusion of light during cleavage of peptide 9. The reason for the limited purity in both cases could result from oxidation of one of more of the multiple methionine residues in peptide 9.

Solid Phase Peptide Synthesis

Peptides were synthesised by using the Fmoc amino acid OPfp ester (where the amine group of the amino acid is protected by Fmoc and the acid group of the amino acid is reacted with pentafluorphenol to form an ester) protocol or Fmoc amino acid/TBTU/N-ethyl morpholine protocol. Fmoc deprotection was accomplished by washing with 20% piperidine in DMF (3 and 17 min) followed by washing with DMF (8 times). Acetylation was performed with Ac-ODhbt (3 equiv.) in DMF.

Assembly of Substrate (AcY(NO$_2$)FN(Trt)PLAVK(Boc-Abz)) on HYDRA (5)

A batch of resin 4c (290 mg, 0.17 mmol OH, 0.11 mmol NH) was treated with a mixture of photolabile linker (344 mg, 6 equiv.), TBTU (198 mg, 5.6 equiv.) and N-ethyl morpholine (84 μL, 6 equiv.) in DMF (3 cm$^3$, incubated 10 min) overnight. The Fmoc group was removed and the peptide was acylated with TBTU/N-ethyl morpholine activated Fmoc-Lys(Boc-Abz)-OH (259 mg, 4 equiv.). After removal of the Fmoc group, the remaining peptide was assembled using Fmoc amino acid OPfp esters (3 equiv.) and 1-hydroxy-7-azabenzotriazole (HOAt) (0.1 equiv.), and was then terminally acetylated with 3-acetoxy-3H-benzo-[d][1,2,3]triazin-4-one (Ac-ODhbt). The resin was treated with 0.1 M NaOH (2 cm$^3$) for 30 min, and washed with water (5 times) and MeCN (5 times). A small sample of resin (about 1 mg) was treated with 95:5 TFA:water for 5 min, washed with DMF (3 times) and water (3 times) and was subjected to photolysis with a 225 W Hg UV lamp for 30 min yielding a small sample of peptide 8 which by RP-HPLC was found to be greater than 95% pure. $R_t$=14.2 min; m/z (ESI) 1156.5 [(M+H)$^+$, 100%, $C_{56}H_{77}N_{14}O_{14}$+H requires 1156.3], 1178.6 [(M+Na)$^+$, 10%].

Assembly of Subtilisin Carlsberg Inhibitor[13] (MMMpMMMFVG) on HYDRA (7)

Resin 5 (0.14 mmol OH) was treated with TBDMS-HMBA (139 mg, 3 equiv.), MSNT (151 mg, 3 equiv.) and N-ethyl imidazole (81 μL, 6 equiv.) in $CH_2Cl_2$ (2 cm$^3$) for 90 min and filtered. A fresh portion of reagents was added and the resin was left overnight. The resin was washed with $CH_2Cl_2$ (3 times) and THF (3 times) and treated with THF containing TBAF (1 M) and AcOH (1 M) for 3 hours. After being washed with THF (3 times), MeCN (3 times) and $CH_2Cl_2$ (3 times), the resin was treated twice with Fmoc-Gly-OH (152 mg, 3 equiv.), MSNT (151 mg, 3 equiv.) and N-ethyl imidazole (81 μL, 6 equiv.) in $CH_2Cl_2$(2 cm$^3$, 2 times for 1 hour). The resin was washed with $CH_2Cl_2$ (3 times), MeCN (3 times) and DMF (3 times), and then the Fmoc group was removed. Assembly of the remaining part of the peptide was accomplished by use of Fmoc amino acid OPfp esters (3 equiv.) and HOAt (0.1 equiv.), except for Fmoc-pro-OH (3 equiv.) which was activated with TBTU (2.8 equiv.) and N-ethyl morpholine (3 equiv.). Upon completion of the peptide sequence and removal of the Fmoc group, the resin was washed with DMF (3 times) and MeCN (3 times). Two small samples of resin (about 1 mg each) were taken out. One was subjected to photolysis as described for resin 5 resulting in identical chromatographic purity and mass spectrometric data as material photolysed off resin 5. The other sample was treated with 0.1 M NaOH (50 μL) in the dark for 1 hour, saturated aqueous $NH_4CL$ (10 μL) and MeCN (50 μL) were added. RP-HPLC of the supernatant showed the purity of peptide 9 to be 61% and peptide 8 was also present. Peptide 9:$R_t$=15.7 min; m/z (ESI) 1205.6 [(M+H)$^+$, 100%, $C_{51}H_{84}N_{10}O_{11}S_6$+H requires 1205.7].

Assembly of Substrate (AcY(NO$_2$)FN(Trt)PLAVK(Abz-Boc)) on PEGA$_{800}$ (10)

PEGA$_{800}$ (55 mg, 0.022 mmol) was treated according to the procedure described for assembly of substrate on HYDRA 5. RP-HPLC data (purity, retention time) and ESI data of photolysed peptide 8 were identical with that of material photolysed from 5.

Assembly of Inhibitor (MMMpMMMFVG) on POEPOP$_{1500}$(11)

POEPOP$_{1500}$ (80 mg, 0.036 mmol) was treated according to the procedure described for assembly of substrate on resin 6. RP-HPLC retention time and ESI data of NaOH cleaved peptide 9 were identical with that of material cleaved from resin 7. RP-HPLC purity was 74%.

Example 8

Enzyme Incubations

Resin bound peptide 8 was examined as a substrate for 27 kDa endoprotease Subtilisin Carlsberg. To investigate HYDRA's enzyme permeability, 5 mg of each resin (5, 7, and 10) were treated with 95:5 TFA:water for 10 min, washed with DMF (3 times), 20% piperidine in DMF (3 times), DMF (3 times), MeCN (10 times), water (3 times) and enzyme buffer (50 mM bicine, 2 mM $CaCl_2$) (3 times). This procedure was used to remove protecting groups. The resins were then each added to an enzyme buffer containing Subtilisin Carlsberg (5·10$^{-8}$ M, 1 cm$^3$) and incubated at ambient temperature for 6 hours. The resins were washed with water (3 times), 2% TFA in water (3 times), water (3 times), 2% aqueous $NaHCO_3$ (3 times) and water (3 times). The washed resin was then photolysed in 100 μL water with a 225 W Hg UV lamp for 30 min after which the supernatant was analysed by RP-HPLC (see FIGS. 2b–d). $R_t$=14.0 min; m/z (ESI) 548.4 [(M+H)$^+$, 96%, $C_{27}H_{45}N_7O_5$ (LAVK(Abz)-NH$_2$)+H requires 548.4], 588.5 [(M+K)$^+$, 31%].

RP-HPLC (reverse phase high pressure liquid chromatography) data recorded at 280 nm can be used to determine the intact substrate left on the resin and the data recorded at 215 nm can be used to calculate the total peptide cleaved from the resin. Nearly all peptide ($R_t$=14.2 min) had been digested (compare chromatograms recorded at 280 nm in FIG. 2a (before enzyme cleavage) and FIG. 2c (after enzyme cleavage)) indicating that the enzyme could react with peptide attached to the exterior and the interior of the resin granulate. If the enzyme was not capable of penetrating the resin, only the small amount of peptide on the exterior of the granulate would be digested. The same experiment conducted on PEGA resin 10 gave a similar result (FIG. 2b). The new peak at $R_t$=14.0 min was determined by ESI-MS to contain the expected peptide fragment LAVK(Abz)-NH$_2$.

The sequence MMMpMMMF has an IC$_{50}$ value of 0.055±0.003 mmol dm$^{-3}$ against Subtilisin Carlsberg endoprotease. The decameric peptide was therefore assembled through the hydroxy functionality of the resin, using a short C-terminal extension. After removal of the protecting groups, resin 7 was incubated with the protease. In this case it was evident that digestion of substrate was inhibited, as seen by the large remaining amount of substrate (FIG. 2d).

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A polymeric material comprising the reaction product of:
    (a) a polyimine formed by reacting an aldehyde and an amine; and
    (b) a reducing agent,
    wherein the polymeric material is a star-block polymer having both amine and hydroxy functionality.

2. The polymeric material of claim 1, wherein the aldehyde is a partially oxidized polyethylene glycol and the amine is a branched amine compound having three or more primary amine groups.

3. The polymeric material of claim 2, wherein the partially oxidized polyethylene glycol contains both hydroxy and aldehyde end groups, wherein the ratio of hydroxy to aldehyde end groups ranges from about 3:1 (hydroxy:aldehyde) to about 1:3 (hydroxy:aldehyde).

4. The polymeric material of claim 3, wherein the ratio of hydroxy to aldehyde end groups ranges from about 3:2 (hydroxy:aldehyde) to about 2:3 (hydroxy:aldehyde).

5. The polymeric material of claim 2, wherein the partially oxidized polyethylene glycol contains from 2 to about 1,000 ethylene glycol units.

6. The polymeric material of claim 5, wherein the partially oxidized polyethylene glycol contains from about 20 to about 45 ethylene glycol units.

7. The polymeric material of claim 2, wherein the amine is $(NH_2—(CH_2)_n—CH_2—)_mX$ where n is an integer of 1 to 7, m=3, and X is nitrogen or CH; or n is an integer of 1 to 7, m=4, and X is carbon.

8. The polymeric material of claim 2, wherein the amine is tris(2-aminoethyl)amine.

9. The polymeric material of claim 2, wherein the polyethylene glycol has an average molecular weight of about 1,500.

10. The polymeric material of claim 1, wherein the aldehyde is a branched compound having three or more aldehyde groups and the amine is a bis-amino polyethylene glycol.

11. The polymeric material of claim 10, wherein the bis-amino polyethylene glycol is formed by reaction of a polyethylene glycol with aziridine.

12. The polymeric material of claim 10, wherein the bis-amino polyethylene glycol is formed by reduction of a polyethylene glycol having two azide end groups.

13. The polymeric material of claim 10, wherein the bis-amino polyethylene glycol contains from 2 to about 1,000 ethylene glycol units.

14. The polymeric material of claim 10, wherein the aldehyde has 3 to 6 aldehyde groups.

15. The polymeric material of claim 14, wherein the aldehyde is: benzene-1,3,5-tricarbaldehyde, $C((CH_2)_nCHO)_4$ where n is an integer of 0 to 4, $CH_3C((CH_2)_mCHO)_3$ where m is an integer of 0 to 4, or $C_6H_3((CH_2)_pCHO)_3$ where p is an integer of 0 to 4.

16. The polymeric material of claim 1, wherein the molar ratio of amine to aldehyde is from about 0.1 to about 10.

17. The polymeric material of claim 1, wherein the reducing agent comprises a borohydride.

18. The polymeric material of claim 17, where in the borohydride is: $NaBH_4$, $NaCNBH_4$, or $NaBH_o(OR_1)_p$, wherein p is an integer in the range of 1 to 3;

o is an integer equal to (4−p); and $R_1$ is an alkyl, aryl, or acyl group.

19. The polymeric material of claim 1, wherein the amine and hydroxy functionality is uniformly distributed throughout the polymeric material.

20. The polymeric material of claim 1, wherein the aldehyde is a compound containing three to six aldehyde groups and the amine is a polyethylene glycol having two amine end groups.

21. The polymeric material of claim 20, wherein the aldehyde is benzene-1,3,5-tricarbaldehyde.

22. The polymeric material of claim 20, wherein the aldehyde is $C((CH_2)_nCHO)_4$ where n is an integer ranging from 0 to 4.

23. The polymeric material of claim 20, wherein the aldehyde is $((CH_2)_mCHO)_4$ where n is an integer ranging from 0 to 4.

24. The polymeric material of claim 20, wherein the aldehyde is $C_6H_3((CH_2)_pCHO)_3$, where p is an integer ranging from 0 to 4.

25. The polymeric material of claim 20, further comprising an immobilized ligand attached to the amine and hydroxy functionality or to both.

26. The polymeric material of claim 25, wherein the immobilized ligand is receptor, antibody, enzyme, or lectin.

27. The polymeric material of claim 1, wherein the amine and aldehyde are present in a ratio of 1:10 (amine:aldehyde) to about 10:1 (amine:aldehyde).

28. The polymeric material of claim 27, wherein the amine and aldehyde are present in a ratio of 3:7 (amine:aldehyde) to about 7:3 (amine:aldehyde).

29. A solid support comprising the polymeric material of claim 1.

30. The solid support of claim 29, wherein the solid support is a chromatographic resin.

31. The polymeric material of claim 1, further comprising one or more therapeutic agents attached to the amine or hydroxy functionality, or to both.

32. The polymeric material of claim 1, further comprising one or more ligands attached to the amine or hydroxy functionality, or to both.

33. A polymeric material comprising polyethylene glycol chains cross-linked with a branching compound to form a star-block polymer having both amine and hydroxy functional groups, wherein the polyethylene glycol chains contain 2 to about 1,000 ethylene glycol units.

34. A method of preparing a polymeric material comprising:

(a) reacting an amine and an aldehyde to form a polyimine;

(b) reducing the polyimine with a reducing agent to form a star-block polymer having amine and hydroxy functionality.

35. The method of claim 34, wherein the aldehyde is a partially oxidized polyethylene glycol and the amine is a branched compound having three or more amino groups.

36. The method of claim 35, wherein the partially oxidized polyethylene glycol contains from 2 to about 1,000 ethylene glycol units.

37. The method of claim 36, wherein the partially oxidized polyethylene glycol contains from about 20 to about 45 ethylene glycol units.

38. The method of claim 35, wherein the partially oxidized polyethylene glycol contains hydroxy and aldehyde end groups, wherein the ratio of hydroxy to aldehyde end groups ranges from about 3:1 (hydroxy:aldehyde to about 1:3 (hydroxy:aldehyde).

39. The method of claim 38, wherein the ratio of hydroxy to aldehyde end groups is from about 3:2 (hydroxy:aldehyde) to about 2:3 (hydroxy:aldehyde).

40. The method of claim 35, wherein the polyethylene glycol has an avenge molecular weight of about 1,500.

41. The method of claim 34, wherein the aldehyde is a branched compound having three or more aldehyde groups and the amine is a bis-amino polyethylene glycol.

42. The method of claim 34, wherein the molar ratio of amine to aldehyde is from about 0.1 to about 10.

43. The method of claim 34, wherein the reducing agent comprises a borohydride.

44. The method of claim 34, wherein the amine and hydroxy functionality is distributed uniformly throughout the polymeric material.

45. The method of claim 34, wherein the aldehyde is a compound containing three to six aldehyde groups and the amine is a polyethylene glycol having two amine end groups.

46. The method of claim 45, wherein the aldehyde is benzene-1,3,5-tricarbaldehyde.

47. The method of claim 45, wherein the aldehyde is $C((CH_2)_nCHO)_4$ where n is an integer ranging from 0 to 4.

48. The method of claim 45, wherein the aldehyde is $((CH_2)_mCHO)_3$ where m is an integer ranging from 0 to 4.

49. The method of claim 45, wherein the aldehyde is $C_6H_3((CH_2)_pCHO)_3$, where p is an integer ranging from 0 to 4.

50. The method of claim 34, wherein the amine and aldehyde are present in a ratio of 1:10 (amine:aldehyde) to about 10:1 (amine:aldehyde).

51. The method of claim 50, wherein the amine and aldehyde are present in a ratio of 3:7 (amine:aldehyde) to about 7:3 (amine:aldehyde).

* * * * *

UNITED STATES PATENT AND TRADEMARK OFFICE
CERTIFICATE OF CORRECTION

PATENT NO. : 6,828,392 B2
DATED : December 7, 2004
INVENTOR(S) : Meldal et al.

It is certified that error appears in the above-identified patent and that said Letters Patent is hereby corrected as shown below:

Title page,
Item [56], References Cited, OTHER PUBLICATIONS, "Grotli" reference, (second occurrence) please delete "and PEG-Cross-Linked," as this phrase is started twice
"Hudson" reference, "Transormations" should read -- Transformations. --
"Kisfauldy" reference, "Pentafluorphenyl" should read -- Pentafluorophenyl. --

Column 8,
Line 28, "salvation" should read -- solvation. --

Column 19,
Line 60, "$((CH_2)_mCHO)_4$" should read -- $CH_3C((CH_2)_mCHO)_4$ --.

Signed and Sealed this

Twenty-eighth Day of June, 2005

JON W. DUDAS
*Director of the United States Patent and Trademark Office*